United States Patent
Sims

(10) Patent No.: US 9,699,056 B2
(45) Date of Patent: *Jul. 4, 2017

(54) SYSTEM AND METHOD OF NETWORK DIAGNOSIS

(71) Applicant: KIP CR P1 LP, New York, NY (US)

(72) Inventor: Robert C. Sims, Round Rock, TX (US)

(73) Assignee: KIP CR P1 LP, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/144,077

(22) Filed: Dec. 30, 2013

(65) Prior Publication Data

US 2014/0112185 A1    Apr. 24, 2014

Related U.S. Application Data

(63) Continuation of application No. 13/091,877, filed on Apr. 21, 2011, now Pat. No. 8,644,185, which is a (Continued)

(51) Int. Cl.
*H04J 1/16* (2006.01)
*H04L 12/26* (2006.01)
*H04L 29/06* (2006.01)

(52) U.S. Cl.
CPC .......... *H04L 43/0888* (2013.01); *H04L 43/10* (2013.01); *H04L 63/0471* (2013.01); *H04L 63/0428* (2013.01)

(58) Field of Classification Search
CPC . H04L 43/00; H04L 43/0888; H04L 43/0894; H04L 43/10
(Continued)

(56) References Cited

U.S. PATENT DOCUMENTS 3,704,363 A    11/1972    Salmassy et al.
3,984,923 A    10/1976    Rawson et al.
(Continued)

FOREIGN PATENT DOCUMENTS

EP    0726570    8/1996
GB    2419198    4/2006

OTHER PUBLICATIONS

Notice of Allowance for U.S. Appl. No. 12/861,609, mailed Feb. 5, 2014, 3 pgs.
(Continued)

*Primary Examiner* — Kan Yuen
(74) *Attorney, Agent, or Firm* — Sprinkle IP Law Group

(57) ABSTRACT

Embodiments provide systems and methods for diagnosing a network and identifying problems in a network which reduce the data transfer rate of data through the network. One embodiment of a method for network diagnosis may include infusing data into a network upstream and downstream of a portion of the network relative to a library drive, querying the drive at intervals over time for drive data to determine the data transfer rate at the drive and comparing the data transfer rate of the data infused upstream of the device or network portion with the data transfer rate of the data infused downstream of the device or network portion to determine throughput. By comparing the data transfer rate of data infused upstream and downstream of a network device or network portion, problem devices in a network may be identified.

13 Claims, 5 Drawing Sheets

Related U.S. Application Data continuation of application No. 12/025,322, filed on Feb. 4, 2008, now Pat. No. 7,974,215.

(58) Field of Classification Search
USPC .......................................................... 370/252
See application file for complete search history.

(56) References Cited

U.S. PATENT DOCUMENTS

| | | | |
|---|---|---|---|
| 4,754,345 A | 6/1988 | Karlstetter | |
| 4,899,230 A | 2/1990 | Sherritt | |
| 4,932,826 A | 6/1990 | Moy et al. | |
| 4,958,235 A | 9/1990 | Sims et al. | |
| 5,004,393 A | 4/1991 | Lunka | |
| 5,253,126 A | 10/1993 | Richmond | |
| 5,303,214 A | 4/1994 | Kulakowski | |
| 5,309,768 A | 5/1994 | Mathews et al. | |
| 5,386,324 A | 1/1995 | Fry et al. | |
| 5,668,800 A | 9/1997 | Stevenson | |
| 5,781,703 A | 7/1998 | Desai et al. | |
| 5,822,516 A | 10/1998 | Krech, Jr. | |
| 5,875,303 A * | 2/1999 | Huizer | G11B 27/10 348/E7.073 |
| 5,881,221 A | 3/1999 | Hoang et al. | |
| 5,883,864 A | 3/1999 | Saliba | |
| 6,052,264 A | 4/2000 | Curtis | |
| 6,052,341 A | 4/2000 | Bingham et al. | |
| 6,058,092 A | 5/2000 | Masters et al. | |
| 6,065,087 A * | 5/2000 | Keaveny | G06F 13/4022 370/402 |
| 6,163,853 A | 12/2000 | Findlay et al. | |
| 6,195,663 B1 * | 2/2001 | Cheng | G06F 3/061 |
| 6,269,330 B1 | 7/2001 | Cidon et al. | |
| 6,304,880 B1 | 10/2001 | Kishi | |
| 6,345,366 B1 | 2/2002 | Asano | |
| 6,490,253 B1 | 12/2002 | Miller et al. | |
| 6,578,083 B2 * | 6/2003 | Tuck, III | H04L 12/2602 370/230 |
| 6,624,958 B1 | 9/2003 | Alva | |
| 6,636,981 B1 | 10/2003 | Barnett et al. | |
| 6,715,031 B2 | 3/2004 | Camble et al. | |
| 6,725,394 B1 | 4/2004 | Bolt | |
| 6,799,156 B1 | 9/2004 | Rieschl et al. | |
| 6,823,401 B2 | 11/2004 | Feather, Jr. et al. | |
| 6,839,824 B2 | 1/2005 | Camble et al. | |
| 6,950,871 B1 | 9/2005 | Honma et al. | |
| 6,971,046 B1 | 11/2005 | Johnson et al. | |
| 7,076,391 B1 | 7/2006 | Pakzad et al. | |
| 7,194,538 B1 | 3/2007 | Rabe et al. | |
| 7,200,546 B1 | 4/2007 | Nourmohamadian et al. | |
| 7,200,722 B2 | 4/2007 | Goodman | |
| 7,263,596 B1 | 8/2007 | Wideman et al. | |
| 7,275,103 B1 | 9/2007 | Thrasher | |
| 7,278,067 B1 | 10/2007 | Coatney et al. | |
| 7,310,745 B2 | 12/2007 | Schnapp et al. | |
| 7,346,801 B2 | 3/2008 | Brunelle et al. | |
| 7,386,667 B2 | 6/2008 | Estelle et al. | |
| 7,443,801 B2 | 10/2008 | Neidhardt et al. | |
| 7,444,469 B2 | 10/2008 | Estelle et al. | |
| 7,483,810 B2 | 1/2009 | Jackson et al. | |
| 7,492,720 B2 | 2/2009 | Pruthi et al. | |
| 7,573,664 B2 | 8/2009 | Bentley et al. | |
| 7,583,604 B2 | 9/2009 | Couturier | |
| 7,596,096 B2 | 9/2009 | Crawford et al. | |
| 7,613,748 B2 | 11/2009 | Brockway | |
| 7,627,786 B2 | 12/2009 | Bello et al. | |
| 7,653,840 B1 | 1/2010 | Taylor et al. | |
| 7,809,990 B2 | 10/2010 | Sasaki | |
| 7,885,805 B2 | 2/2011 | Dickens et al. | |
| 7,908,366 B2 | 3/2011 | Sims | |
| 7,971,006 B2 | 6/2011 | Justiss et al. | |
| 7,974,215 B1 | 7/2011 | Sims | |
| 8,032,701 B1 | 10/2011 | Glade | |
| 8,035,911 B2 | 10/2011 | Ballard et al. | |
| 8,099,624 B1 | 1/2012 | Saxena et al. | |
| 8,108,544 B2 | 1/2012 | Ramakrishnan et al. | |
| 8,117,501 B2 | 2/2012 | Taniyama et al. | |
| 8,145,572 B2 | 3/2012 | Ito | |
| 8,180,824 B2 | 5/2012 | McCoy et al. | |
| 8,195,986 B2 | 6/2012 | Meaney et al. | |
| 8,387,054 B1 | 2/2013 | Zeis | |
| 8,495,432 B2 | 7/2013 | Dickens et al. | |
| 8,631,127 B2 | 1/2014 | Sims | |
| 8,631,281 B1 | 1/2014 | Stripling et al. | |
| 8,639,807 B2 | 1/2014 | Sims | |
| 8,644,185 B2 | 2/2014 | Sims | |
| 8,645,328 B2 | 2/2014 | Sims | |
| 8,650,241 B2 | 2/2014 | Moody, II et al. | |
| 8,832,495 B2 | 9/2014 | Foster et al. | |
| 8,843,787 B1 | 9/2014 | Foster et al. | |
| 8,949,667 B2 | 2/2015 | Foster et al. | |
| 9,015,005 B1 | 4/2015 | Stripling | |
| 9,058,109 B2 | 6/2015 | Moody, II et al. | |
| 9,081,730 B2 | 7/2015 | Foster et al. | |
| 9,092,138 B2 | 7/2015 | Sims et al. | |
| 9,280,410 B2 | 3/2016 | Foster et al. | |
| 9,317,358 B2 | 4/2016 | Foster et al. | |
| 9,442,795 B2 | 9/2016 | Stripling et al. | |
| 9,501,348 B2 | 11/2016 | Foster | |
| 2001/0039579 A1 | 11/2001 | Trcka et al. | |
| 2001/0040748 A1 | 11/2001 | Nagai et al. | |
| 2002/0006004 A1 | 1/2002 | Miyamura | |
| 2002/0055999 A1 | 5/2002 | Takeda | |
| 2002/0169996 A1 | 11/2002 | King et al. | |
| 2003/0016609 A1 | 1/2003 | Rushton | |
| 2003/0070053 A1 | 4/2003 | Gallo et al. | |
| 2003/0097439 A1 | 5/2003 | Strayer et al. | |
| 2003/0126395 A1 | 7/2003 | Camble et al. | |
| 2003/0128448 A1 | 7/2003 | Gunderson et al. | |
| 2003/0225865 A1 | 12/2003 | Koestler | |
| 2003/0233431 A1 | 12/2003 | Reddy et al. | |
| 2004/0015755 A1 | 1/2004 | Klotz | |
| 2004/0022263 A1 | 2/2004 | Zhao et al. | |
| 2004/0030857 A1 | 2/2004 | Krakirian | |
| 2004/0078419 A1 | 4/2004 | Ferrari et al. | |
| 2004/0078697 A1 | 4/2004 | Duncan | |
| 2004/0139195 A1 | 7/2004 | Feather, Jr. et al. | |
| 2004/0139240 A1 | 7/2004 | DiCorpo et al. | |
| 2004/0168102 A1 | 8/2004 | Tsunoda | |
| 2005/0044451 A1 | 2/2005 | Fry et al. | |
| 2005/0052772 A1 | 3/2005 | Barbian et al. | |
| 2005/0076263 A1 | 4/2005 | Tomita | |
| 2005/0086554 A1 | 4/2005 | Simes | |
| 2005/0091369 A1 | 4/2005 | Jones | |
| 2005/0138195 A1 | 6/2005 | Bono | |
| 2005/0149829 A1 | 7/2005 | Lee | |
| 2005/0174869 A1 | 8/2005 | Kottomtharayil et al. | |
| 2005/0210161 A1 | 9/2005 | Guignard et al. | |
| 2005/0231846 A1 | 10/2005 | Winarski et al. | |
| 2005/0246376 A1 | 11/2005 | Lu et al. | |
| 2005/0246509 A1 | 11/2005 | Topham et al. | |
| 2005/0262231 A1 | 11/2005 | Lowe et al. | |
| 2006/0085595 A1 | 4/2006 | Slater | |
| 2006/0092850 A1 | 5/2006 | Neidhardt et al. | |
| 2006/0126211 A1 | 6/2006 | Sasaki | |
| 2006/0168499 A1 | 7/2006 | Edwards et al. | |
| 2006/0170238 A1 | 8/2006 | Justiss et al. | |
| 2006/0174071 A1 | 8/2006 | Justiss et al. | |
| 2006/0190205 A1 | 8/2006 | Klein et al. | |
| 2006/0242489 A1 | 10/2006 | Brockway et al. | |
| 2007/0025008 A1 | 2/2007 | Ballard | |
| 2007/0043885 A1 | 2/2007 | Gallo | |
| 2007/0067678 A1 | 3/2007 | Hosek et al. | |
| 2007/0079048 A1 | 4/2007 | Starr et al. | |
| 2007/0106840 A1 | 5/2007 | Estelle | |
| 2007/0186066 A1 | 8/2007 | Desai et al. | |
| 2007/0226336 A1 | 9/2007 | Katagiri et al. | |
| 2007/0253088 A1 | 11/2007 | Clarke et al. | |
| 2007/0255920 A1 | 11/2007 | Gold | |
| 2007/0294591 A1 | 12/2007 | Usynin et al. | |
| 2008/0019283 A1 | 1/2008 | Emile | |
| 2008/0077825 A1 | 3/2008 | Bello et al. | |
| 2008/0098168 A1 | 4/2008 | Estelle | |
| 2008/0109547 A1 | 5/2008 | Bao et al. | |

(56) References Cited

U.S. PATENT DOCUMENTS

| | | |
|---|---|---|
| 2008/0115015 A1 | 5/2008 | Ikezawa et al. |
| 2008/0259809 A1 | 10/2008 | Stephan et al. |
| 2008/0282265 A1 | 11/2008 | Foster et al. |
| 2009/0044047 A1 | 2/2009 | Bates et al. |
| 2009/0059757 A1 | 3/2009 | Haustein et al. |
| 2009/0070092 A1 | 3/2009 | Dickens et al. |
| 2009/0103432 A1 | 4/2009 | Trikoz et al. |
| 2009/0106816 A1 | 4/2009 | Ito |
| 2009/0113129 A1 | 4/2009 | Deicke et al. |
| 2009/0177314 A1 | 7/2009 | Greco et al. |
| 2009/0198650 A1 | 8/2009 | Sims |
| 2009/0198737 A1 | 8/2009 | Sims |
| 2009/0199045 A1 | 8/2009 | Kasubuchi et al. |
| 2010/0023604 A1 | 1/2010 | Verma et al. |
| 2010/0033863 A1 | 2/2010 | Fry et al. |
| 2010/0125740 A1 | 5/2010 | Grechanik |
| 2010/0174878 A1 | 7/2010 | Davis et al. |
| 2010/0182887 A1 | 7/2010 | Moody et al. |
| 2010/0228805 A1 | 9/2010 | McCoy et al. |
| 2010/0250698 A1 | 9/2010 | Haustein et al. |
| 2010/0275219 A1 | 10/2010 | Carlson et al. |
| 2011/0194451 A1 | 8/2011 | Sims |
| 2012/0185589 A1 | 7/2012 | Sims |
| 2012/0221597 A1 | 8/2012 | Sims |
| 2013/0067587 A1 | 3/2013 | Leet et al. |
| 2014/0085744 A1 | 3/2014 | Stripling et al. |
| 2014/0095815 A1 | 4/2014 | Sims |
| 2014/0112118 A1 | 4/2014 | Moody, II et al. |
| 2014/0122438 A1 | 5/2014 | Sims |
| 2014/0325284 A1 | 10/2014 | Foster et al. |
| 2014/0359369 A1 | 12/2014 | Foster et al. |
| 2015/0106654 A1 | 4/2015 | Foster et al. |
| 2015/0178006 A1 | 6/2015 | Stripling et al. |
| 2015/0243323 A1 | 8/2015 | Moody, II et al. |
| 2015/0278007 A1 | 10/2015 | Foster et al. |
| 2016/0134507 A1 | 5/2016 | Sims |
| 2016/0148646 A1 | 5/2016 | Foster et al. |
| 2016/0171999 A1 | 6/2016 | Stripling et al. |
| 2017/0040034 A1 | 2/2017 | Foster et al. |

OTHER PUBLICATIONS

Office Action for U.S. Appl. No. 14/574,077, mailed Feb. 25, 2015, 15 pgs.
Notice of Allowance for U.S. Appl. No. 14/099,591, mailed Feb. 27, 2015, 10 pgs.
Notice of Allowance for U.S. Appl. No. 14/464,034, mailed Mar. 9, 2015, 2 pgs.
Notice of Allowance for U.S. Appl. No. 11/801,809, mailed Mar. 25, 2014, 4 pgs.
Office Action for U.S. Appl. No. 12/025,300, mailed Apr. 23, 2014, 29 pgs.
Office Action for U.S. Appl. No. 14/143,046, mailed May 7, 2014, 18 pgs.
Office Action for U.S. Appl. No. 14/099,591, mailed Jun. 2, 2014, 13 pgs.
Notice of Allowance for U.S. Appl. No. 11/801,809, mailed Jun. 27, 2014, 4 pgs.
Office Action for U.S. Appl. No. 12/888,954, mailed Jul. 14, 2015, 15 pgs.
Kolaks, Marc S., "Securing out-of-band device management," SANS Institute 2003, GIAC Security Essentials Certification (GSEC), Practical Version 1.4, pp. 1-19.
Notice of Allowance for U.S. Appl. No. 14/092,729, mailed Aug. 11, 2015, 5 pgs.
Notice of Allowance for U.S. Appl. No. 14/464,034, mailed Dec. 19, 2014, 2 pgs.
Office Action for U.S. Appl. No. 14/092,729, mailed Dec. 24, 2014, 8 pgs.
Office Action for U.S. Appl. No. 12/888,954, mailed Jan. 5, 2015, 15 pgs.
Notice of Allowance for U.S. Appl. No. 12/025,300, mailed Jan. 16, 2015, 7 pgs.
Notice of Allowance for U.S. Appl. No. 14/574,077, mailed Jun. 15, 2015, 5 pgs.
Notice of Allowance for U.S. Appl. No. 12/861,609, mailed Jun. 27, 2014, 4 pgs.
Notice of Allowance for U.S. Appl. No. 12/025,300, mailed Sep. 24, 2014, 10 pgs.
Notice of Allowance for U.S. Appl. No. 14/574,077, mailed Sep. 23, 2015, 5 pgs.
Notice of Allowance for U.S. Appl. No. 14/737,007, mailed Oct. 13, 2015, 9 pgs.
Office Action for U.S. Appl. No. 14/099,591, mailed Oct. 1, 2014, 5 pgs.
Corrected Notice of Allowability for U.S. Appl. No. 14/324,980, mailed Oct. 24, 2014, 4 pgs.
Office Action for U.S. Appl. No. 14/464,034, mailed Nov. 5, 2014, 8 pgs.
Notice of Allowance for U.S. Appl. No. 14/324,980, mailed Nov. 24, 2014, 5 pgs.
Notice of Allowance for U.S. Appl. No. 14/143,046, mailed Dec. 18, 2014, 8 pgs.
Notice of Allowance for U.S. Appl. No. 14/143,046, mailed Feb. 12, 2015, 10 pgs.
Weber, Ralph O. (ed.) Information Technology—SCSI Primary Commands—4 (SPC-4), Project T10/1731-D, Working Draft, rev. 2, Sep. 15, 2005, ENDL Texas, Dallas, TX, 499 pgs.
Penokie, George (ed.) Information Technology13 SCSI Block Commands—3 (SBC-3), T10/1799-D, Working Draft, Rev. 6, Jul. 24, 2006, IBM Corp., Rochester, MN, 169 pgs.
Weber, Ralph O. (ed.) Information Technology—SCSI Primary Commands—4 (SPC-4), Project T10/1731-D, Working Draft, rev. 10, Apr. 21, 2007, ENDL Texas, Dallas, TX, 551 pgs.
Weber, Ralph O.(ed.) Information Technology—SCSI Primary Commands—3 (SPC-3), Project T10/1416-D, Working Draft, rev. 22a, Mar. 25, 2005, ENDL Texas, Dallas, TX, 496 pgs.
Oetting, Erich (ed.) Information Technology—SCSI Media Changer Commands—2 (SMC-2), INCITS T10 Project 1383D, Working Draft, rev. 7, Nov. 18, 2003, Storage Tech Corp., Louisville, CO. 68 pgs.
International Search Report and Written Opinion for International Patent Application No. PCT/US2008/63227, mailed Aug. 29, 2008, 7 pgs.
International Search Report and Written Opinion for International Patent Application No. PCT/US2009/032402, mailed Jun. 29, 2009, 11 pgs.
International Search Report and Written Opinion for International Patent Application No. PCT/US2009/032390, mailed Jul. 3, 2009, 13 pgs.
Boehler, Paul, "Common SCSI/ATAPI Command Set for Streaming Tape" QIC 157, Revision D, Quarter-Inch Cartridge Drive Standards, Santa Barbara, CA, Dec. 13, 1995, 50 pgs.
Office Action for U.S. Appl. No. 12/025,322, mailed Dec. 30, 2009, 11 pgs.
Office Action for U.S. Appl. No. 12/025,436, mailed Mar. 30, 2010, 15 pgs.
Office Action for U.S. Appl. No. 12/024,755, mailed Jun. 23, 2010, 11 pgs.
Office Action for U.S. Appl. No. 12/025,322, mailed Jul. 8, 2010, 15 pgs.
International Preliminary Report on Patentability (Ch. I) for International Application No. PCT/US2009/032402, issued on Aug. 3, 2010, 8 pgs.
International Preliminary Report on Patentability (Ch. I) for International Application No. PCT/US2009/032390 issued on Aug. 10, 2010, 8 pgs.
Office Action for U.S. Appl. No. 12/025,436, mailed Sep. 15, 2010, 21 pgs.
"SCSI DDS Tape Expert Tool (mstm Online Help)," Hewlett Packard, updated Apr. 29, 2002 and printed on Aug. 30, 2010, 8 pgs. at http://docs.hp.com/hpux/onlinedocs/diag/stm/help/expert/scsi_ddsm.htm.

(56) References Cited

OTHER PUBLICATIONS

Office Action for U.S. Appl. No. 11/801,809, mailed Sep. 23, 2010, 31 pgs.
Notice of Allowance for U.S. Appl.No. 12/024,755, mailed Dec. 10, 2010, 14 pgs.
Office Action for U.S. Appl. No. 11/801,809, mailed Feb. 16, 2011, 23 pgs.
Notice of Allowance for U.S. Appl. No. 12/025,322, mailed Feb. 17, 2011, 5 pgs.
Office Action for U.S. Appl. No. 12/025,436, mailed Mar. 11, 2011, 25 pgs.
International Search Report and Written Opinion for International Patent Application No. PCT/US2011/021517, mailed Apr. 19, 2011, 12 pgs.
Office Action for U.S. Appl. No. 11/801,809, mailed Jun. 7, 2011, 16 pgs.
Office Action for U.S. Appl. No. 12/025,436, mailed Aug. 22, 2011, 32 pgs.
International Preliminary Report on Patentability (Ch. II) for International Patent Application No. PCT/US08/63227, mailed Oct. 31, 2011, Patent Cooperation Treaty, 25 pgs.
Corrected International Preliminary Report on Patentability (Ch. II) for International Patent Application No. PCT/US08/63227, mailed Feb. 2, 2012, Patent Cooperation Treaty, 22 pgs.
Office Action for U.S. Appl. No. 13/459,720, mailed Aug. 1, 2012, 16 pgs.
Office Action for U.S. Appl. No. 13/430,429, mailed Aug. 2, 2012, 15 pgs.
Office Action for U.S. Appl. No. 12/025,300, mailed Aug. 6, 2012, 30 pgs.
Office Action for U.S. Appl. No. 12/861,609, mailed Aug. 7, 2012, 10 pgs.
Office Action for U.S. Appl. No. 13/091,877, mailed Oct. 11, 2012, 14 pgs.
Office Action for U.S. Appl. No. 12/025,436, mailed Nov. 9, 2012, 34 pgs.
Office Action for U.S. Appl. No. 12/861,612, mailed Nov. 27, 2012, 12 pgs.
Office Action for U.S. Appl. No. 12/888,954, mailed Dec. 13, 2012, 14 pgs.
Office Action for U.S. Appl. No. 12/861,609, mailed Jan. 4, 2013, 12 pgs.
Notice of Allowance for U.S. Appl. No. 13/430,429, mailed Feb. 11, 2013, 6 pgs.
Notice of Allowance for U.S. Appl. No. 13/459,720, mailed Feb. 11, 2013, 6 pgs.
Office Action for U.S. Appl. No. 12/025,300, mailed Feb. 15, 2013, 35 pgs.
Office Action for U.S. Appl. No. 12/692,403, mailed Feb. 20, 2013, 35 pgs.
IBM et al., Hardware and Volume Statistical Analysis and Reporting System for Detecting and Isolating Media and Hardware Errors on the Magstar Family of Tape Drives, Dec. 1, 1999, 4 pgs (IP.com No. IPCOM000013086D).
International Preliminary Report on Patentability (Ch. I) for International Patent Application No. PCT/US2011/021517, mailed Aug. 2, 2012, 8 pgs.
Notice of Allowance for U.S. Appl. No. 13/091,877, mailed Feb. 27, 2013, 10 pgs.
Notice of Allowance for U.S. Appl. No. 12/025,436, mailed Mar. 8, 2013, 10 pgs.
Office Action for U.S. Appl. No. 11/801,809, mailed Mar. 27, 2013, 13 pgs.
Notice of Allowance for U.S. Appl. No. 13/459,720, mailed May 7, 2013, 2 pgs.
Notice of Allowance for U.S. Appl. No. 13/430,429, mailed May 14, 2013, 4 pgs.
Notice of Allowance for U.S. Appl. No. 12/692,403, mailed May 14, 2013, 5 pgs.
Office Action for U.S. Appl. No. 12/861,612, mailed Jun. 11, 2013, 12 pgs.
Notice of Allowance for U.S. Appl. No. 13/091,877, mailed Jun. 11, 2013, 7 pgs.
Notice of Allowance for U.S. Appl. No. 11/801,809, mailed Jun. 20, 2013, 4 pgs.
Office Action for U.S. Appl. No. 12/025,300, mailed Jul. 30, 2013, 29 pgs.
Notice of Allowance for U.S. Appl. No. 13/430,429, mailed Aug. 1, 2013, 3 pgs.
Notice of Allowance for U.S. Appl. No. 13/459,720, mailed Aug. 5, 2013, 3 pgs.
Notice of Allowance for U.S. Appl. No. 12/692,403, mailed Aug. 16, 2013, 3 pgs.
Notice of Allowance for U.S. Appl. No. 11/801,809, mailed Aug. 22, 2013, 5 pgs.
Office Action for U.S. Appl. No. 12/888,954, mailed Aug. 23, 2013, 16 pgs.
Office Action for U.S. Appl. No. 12/861,609, mailed Sep. 6, 2013, 11 pgs.
Notice of Allowance for U.S. Appl. No. 12/861,612, mailed Sep. 30, 2013, 12 pgs.
Notice of Allowance for U.S. Appl. No. 12/025,436, mailed Oct. 4, 2013, 5 pgs.
Notice of Allowance for U.S. Appl. No. 13/091,877, mailed Oct. 8, 2013, 5 pgs.
Notice of Allowance for U.S. Appl. No. 13/430,429, mailed Oct. 30, 2013, 3 pgs.
Notice of Allowance for U.S. Appl. No. 13/459,720, mailed Oct. 30, 2013, 3 pgs.
Office Action for U.S. Appl. No. 11/801,809, mailed Dec. 17, 2013, 8 pgs.
Office Action for U.S. Appl. No. 12/025,300, mailed Jan. 2, 2014, 33 pgs.
Notice of Allowance for U.S. Appl. No. 14/324,980, mailed Aug. 25, 2014, 6 pgs.
Notice of Allowance for U.S. Appl. No. 14/574,077, mailed Jan. 21, 2016, 4 pgs.
Office Action for U.S. Appl. No. 15/010,954, mailed Apr. 21, 2016, 16 pgs.
Office Action for U.S. Appl. No. 14/144,067, mailed May 4, 2016, 11 pgs.
Office Action for U.S. Appl. No. 12/888,954, mailed Jun. 15, 2016, 15 pgs.
Notice of Allowance for U.S. Appl. No. 15/010,954, mailed Jul. 19, 2016, 4 pgs.
Office Action for U.S. Appl. No. 14/144,067, mailed Nov. 16, 2016, 12 pgs.
Office Action for U.S. Appl. No. 14/710,807, mailed Dec. 1, 2016, 22 pgs.
Office Action for U.S. Appl. No. 12/888,954, mailed Dec. 20, 2016, 16 pgs.
"Storage Security Best Current Practices (BCPs)", Storage Networking Industry Association, Version 2.1.0, SNIA Technical Proposal, Sep. 4, 2008, 38 pgs.
Office Action for U.S. Appl. No. 14/144,067, mailed Mar. 20, 2017, 14 pgs.
Office Action for European Patent Application No. 11703750.7, mailed Feb. 13, 2017, 18 pgs.
Office Action for U.S. Appl. No. 15/297,907, mailed Apr. 24, 2017, 17 pgs.
Office Action for U.S. Appl. No. 15/000,888, mailed May 9, 2017, 10 pgs.
Office Action for U.S. Appl. No. 14/640,072, mailed May 17, 2017, 18 pgs.

* cited by examiner

```
<drive_log_sense timestamp="2007/07/16 10:13:38">
<sn>1210140255</sn>
<vol_id> </vol_id>
<write_errors_delay>0x0</write_errors_delay>
<write_errors_wo_delay>0x0</write_errors_wo_delay>
<write_total_error_correction_processed>0x0</write_total_error_correction_processed>
<write_total_errors>0x0</write_total_errors>
<write_total_errors_corrected>0x0</write_total_errors_corrected>
<write_total_uncorrected_errors>0x0</write_total_uncorrected_errors>
<read_errors_delay>0x0</read_errors_delay>
<read_errors_wo_delay>0x0</read_errors_wo_delay>
<read_total_error_correction_processed>0x0</read_total_error_correction_processed>
<read_total_errors>0x0</read_total_errors>
<read_total_errors_corrected>0x0</read_total_errors_corrected>
<read_total_uncorrected_errors>0x0</read_total_uncorrected_errors>
<MB_read>0x019</MB_read>           ~~~ 510
<MB_written>0x061fa</MB_written>
<MB_written_compressed>0x02a70</MB_written_compressed>
<MB_read_compressed>0x08</MB_read_compressed>
<needs_cleaning>0x0</needs_cleaning>
<status>0x0</status>
</drive_log_sense>
```

*FIG. 5*

SYSTEM AND METHOD OF NETWORK DIAGNOSIS

CROSS-REFERENCE TO RELATED APPLICATION

This application is a continuation of, and claims a benefit of priority under 35 U.S.C. 120 of the filing date of U.S. patent application Ser. No. 13/091,877 by inventor Robert C. Sims, entitled "SYSTEM AND METHOD OF NETWORK DIAGNOSIS" filed on Apr. 21, 2011, which is a continuation of, and claims a benefit of priority under 35 U.S.C. 120 of the filing date of U.S. patent application Ser. No. 12/025,322 by inventor Robert C. Sims entitled "SYSTEM AND METHOD OF NETWORK DIAGNOSIS" filed on Feb. 4, 2008, issued as U.S. Pat. No. 7,974,215 on Jul. 5, 2011, the entire contents of which are hereby expressly incorporated by reference for all purposes.

TECHNICAL FIELD

This disclosure describes systems and methods of network diagnosis. More particularly, embodiments of methods and systems regard infusing data at known locations to diagnose network performance. In one embodiment, the performance of devices in the network and the data transfer rate through network devices can be determined such that the performance of devices in the context of a network can be diagnosed.

BACKGROUND

Networks can be comprised of a multiplicity of network devices such as servers, routers, hosts, switches, repeaters, hubs, encryption devices and backup devices such as media libraries.

In many systems, data may be sent over a network from multiple hosts on the network to a library for storage. Such hosts may include computers, servers or other devices. In many instances, the data is routed to the library through a multiplicity of network devices which may include one or more switches, routers, servers, hubs, encryption devices or other network devices. A host or other device may also request data from a library and this data may be routed to the host or other device through the network.

One example of a library commonly used for data storage is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When data is to be written to or read from the library, a host device determines which cartridge slot contains the tape cartridge that is to be written to or read from. The host device then transmits a move-element command to the robot and the robot moves the tape cartridge to a tape drive which reads the desired data from the tape cartridge.

A tape drive in a library reads from or writes to magnetic tape contained in a cartridge utilizing a sensor which may comprise a read head and a write head. In one embodiment of a drive, magnetic tape is pulled past the sensor comprising the read head and the write head such that the read head can read data from the tape and the write head can write data to the tape.

Reading and writing to a cartridge inherently causes the degradation of the tape comprising the cartridge because the tape is pulled past the read and write heads. Pulling the tape past the read and write heads may strain the tape and the tape may collide with the read or the write heads at read or write speed. Especially deleterious to tape life is starving a drive of data to write to a tape. In particular, if data is received at a drive at below the drive's ability to write data (i.e. at below the drive's streaming rate), then the movement of magnetic tape may have to be slowed or reversed in order to write data with the necessary density, wearing the tape. Such back and forth pulling of tape past the read and write heads of a drive is referred to as "shoe-shining" and has the potential to accelerate tape degradation. Consequently, bottlenecks or other decreases in data transfer rates caused by network devices can have a deleterious effect at the library.

SUMMARY

Embodiments provide systems and methods for network diagnosis and the identification of problem devices in a network or other issues. A system for network diagnosis can include a library comprising a drive, a network coupled to the drive and operable to transmit data to the drive, an infusion device coupled to the network upstream of a portion of the network relative to the drive and operable to infuse control data into the network and a monitoring appliance coupled to the network and operable to send commands to the drive over the network, wherein the monitoring appliance is further operable to calculate the data transfer rate at the drive based on drive data returned in response to the commands. In some embodiments, two or more infusion devices may be coupled to the network, each infusion device upstream or downstream of a network portion. In embodiments of a system for network diagnosis, the monitoring appliance can communicate with the infusion device(s) over the network to cause the infusion device(s) to begin infusing data into the network.

Embodiments of methods and systems for network diagnosis can include a method comprising infusing control data into a network coupled to a drive at known location(s) upstream and downstream of a portion of the network relative to the drive, querying the drive at intervals over time for drive data by sending one or more Log Sense (LS) commands or Inquiry commands to the drive and determining the data transfer rates at the drive for data infused upstream and downstream of the portion of the network based on returned drive data.

Embodiments of methods and systems for network diagnosis can include one or more computer readable media comprising computer instructions executable to perform the above method. Such computer readable media may be contained in a monitoring appliance or an infusion device.

By diagnosing a network and identifying problem devices or other issues which reduce throughput through the network or otherwise reduce the data transfer rate of data through the network, networks problems can be discovered and addressed, improving throughput through the network and preventing network devices from reducing the data transfer rate. Furthermore, because issues which reduce the data transfer rate through a network are resolved, data transfer rates which cause the starving of data to a drive of a library and the consequent shoe-shining of magnetic tape in cartridges being written to by the drive may be avoided, extending the life and enhancing the reliability of magnetic tape cartridges.

BRIEF DESCRIPTION OF THE FIGURES

A more complete understanding of embodiments of methods and systems and the advantages thereof may be acquired by referring to the following description, taken in conjunction with the accompanying drawings in which like reference numbers indicate like features and wherein:

FIG. 5 is an XML representation of an example of data returned in response to a LS command;

DESCRIPTION

Figure 1:
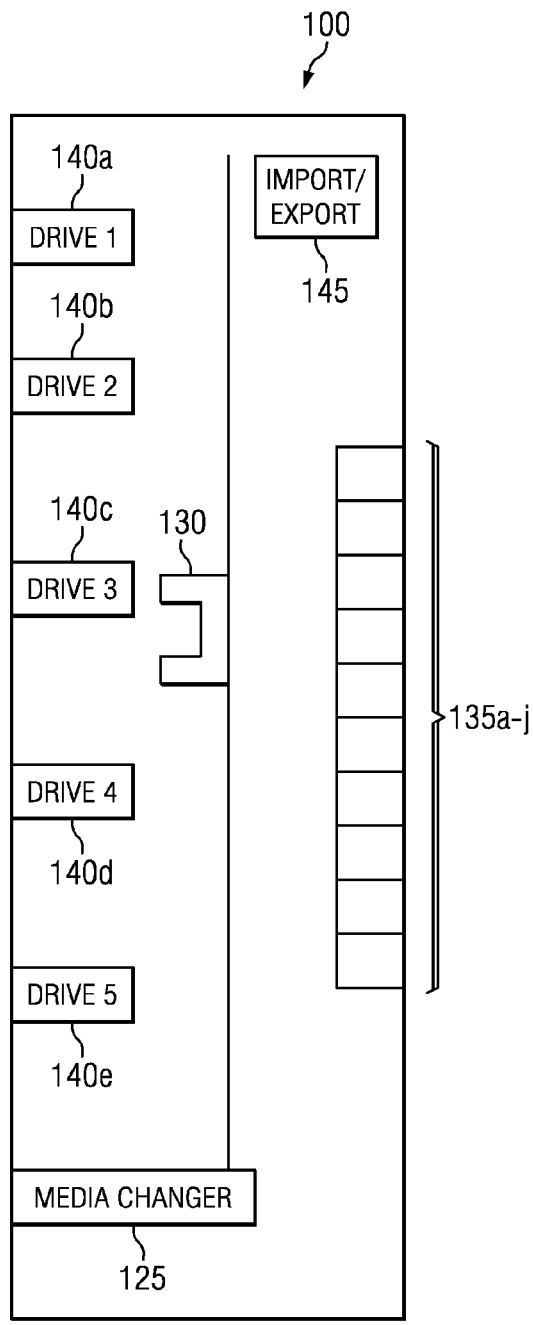
FIG. 1 is a diagrammatic representation of one embodiment of a library.

Embodiments are illustrated in the FIGURES, like numerals being used to refer to like and corresponding parts of the various drawings.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

This disclosure describes systems and methods for diagnosing networks. Embodiments of systems and methods may be used to diagnose networks such that bottlenecks, inefficiencies or problem devices in the network can be identified. Data sent over a network to be stored in magnetic tapes at a library may encounter bottlenecks, inefficiencies or problem devices in the network which may slow the transmission of the data or reduce the data transfer rate (which can be expressed in MB/s) to the library, reducing the amount of data received by a library drive to below a library drive's streaming rate. Starving a drive of data in such a manner can cause the movement of magnetic tape being written to by a drive to be slowed or reversed in order to write data with the necessary density, wearing the tape in a so-called shoe-shine fashion. Similarly, data sent from a drive to a host or other device over a network may also encounter bottlenecks or problem devices.

To detect bottlenecks, inefficiencies or problem devices in a network that reduce the data transfer rate to a drive to below the drive's streaming rate, data may be artificially infused into a network at known locations upstream or downstream of specified devices or network portions and the data transfer rate of the infused data at a drive may be monitored. For example, known data may be artificially infused upstream of an encryption appliance utilizing an infusion device and the data transfer rate of the artificially infused data may be monitored at a library drive utilizing a monitoring appliance which may be a Read Verify Appliance (RVA). Known data may also be artificially infused downstream of the encryption appliance utilizing another or the same infusion device and the data transfer rate of the artificially infused data may be monitored at a library drive utilizing the monitoring appliance. If the monitoring appliance detects that the data transfer rate of the data infused upstream of the encryption appliance is slower at a library drive than data infused downstream of the encryption appliance, it may be determined that the encryption appliance is acting as a bottleneck, lowering the data transfer rate, reducing the throughput of the network and perhaps contributing to starving one or more drives in a network of data.

Similarly, data may be requested from a specific drive of a library at two or more known locations in a network and the difference in the data transfer rates of data sent to different locations from the drive may be monitored at the drive utilizing the monitoring device. Differences in the data transfer rates may be used to determine problem network devices or portions of the network which act as a bottleneck.

FIG. 1 is a diagrammatic representation of one embodiment of a tape library, as would be understood by one of ordinary skill in the art. Library 100 can comprise drives 140a-140e, media changer 125 and associated robot 130, import/export element(s) 145 and slots 135a-135j. Drives 140a-140e can read/write data from/to magnetic tape (contained within cartridges), eject tape cartridges and perform other operations. Slots 135a-135j store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be read from the tape cartridge. It should be noted that some libraries may employ a single robot or multiple robots in an expandable or modular configuration.

To collect data associated with a library or library components such as, for example, drives, a monitoring appliance can query a library or library components over a network utilizing commands. In response to received commands, the library or library drives may return data associated with a particular command to the monitoring appliance. In one embodiment, a monitoring appliance can query a library drive over a network utilizing SCSI commands such as the Log Sense Command, Inquiry Command and other commands.

A Log Sense (LS) command is a command which is used to obtain data associated with a particular drive. A LS command is sent to a particular drive of a library and in response, the drive returns data associated with media contained in the drive. For example, such data might include: utilization and performance data such as, for example, data transfer rates, media loaded, the amount of data received by the drive, the amount of data sent or transmitted by the drive, the amount of data written by the drive, the amount of data read by the drive or other data. In one embodiment, the drive returns the current count of bytes transferred since a cartridge was loaded. Examples of a LS command can be found in "SCSI Primary Commands-3 (SPC-3)", (Project T10/1416-D), Revision 22a, Mar. 25, 2005, propagated by the T10 Technical Committee of the InterNational Committee on Information Technology Standards (INCITS), which is hereby incorporated by reference.

An Inquiry command is a command that is used to query the serial number of components of a library such as a drive or a media changer. Embodiments of Inquiry commands query individual library components. That is, an individual Inquiry command may query a particular drive for its serial number. Examples of an Inquiry command can be found in "SCSI Primary Commands-3 (SPC-3)", (Project T10/1416-D), Revision 22a, Mar. 25, 2005, propagated by the T10 Technical Committee of the InterNational Committee on Information Technology Standards (INCITS), referenced above.

Methods and systems for collecting data from a library or library drive can utilize a monitoring appliance which can be a Read Verify Appliance (RVA). The monitoring appliance queries a library or drives by sending LS, Inquiry commands and/or other commands to the library or library components at intervals. Data returned in response to the commands may be used to determine the data transfer rate of data to (or from) a drive and whether the data transfer rate is below the drive's streaming rate, causing shoe-shining. It should be noted that determining the data transfer rate of data may comprise one or more calculations. Data returned in response to the commands may be saved to a repository and information or data calculated from returned data (for example, the data transfer rate at the drive) may also be saved to the repository. For example, a LS command may be sent to a drive periodically, such as, for example, every 30 seconds, such that when data is being received by a drive from the network and written to magnetic tape, the amount of data received by the drive within the period between LS commands may be returned to the monitoring appliance in response to the LS commands. This returned data specifying the amount of data received at the drive may be used to determine the data transfer rate at which the drive receives data or the rate at which the drive writes data to magnetic tape. Based on the data transfer rate, it can be determined whether the drive is receiving data at a desired data transfer rate, above the streaming rate of the drive or below the streaming rate of the drive. Similarly, LS commands can be used to determine the data transfer rate of data sent over a network from a drive.

To write data to media contained in a drive of a library or read data from media contained in a drive of a library, thereby infusing data into a network, a device such as an infusion device located at a known location in a network can send commands to one or more library drives. In one embodiment, the commands used to infuse data into a network may be Write commands or Read commands.

A Write command is a command which can be used to transfer data to specified drives and write data to tape cartridges (or other library media such as laser discs, hard drives or any other media). That is, a device, which may be an infusion device, sends a Write command which may contain data to a drive and in response, the drive writes the data contained in that Write command to a cartridge. Thus a Write command can be used to send data to a drive over a network or portion thereof. Examples of a Write command can be found in "SCSI Block Commands-3 (SBC-3)", (Project T10/1799-D), Revision 6, 24 Jul. 2006, propagated by the T10 Technical Committee of the InterNational Committee on Information Technology Standards (INCITS), which is hereby incorporated by reference.

A Read command is a command which can be used to read tape cartridges (or other library media such as laser discs, hard drives or any other media). That is, a requesting device-which may in one embodiment be an infusion device-sends a Read command to a specified drive and in response, the drive reads data stored on the cartridge and the read data is returned to the requesting device. Thus a Read command can be used to retrieve data from a tape cartridge in a drive and transmit the retrieved data over a network or portion thereof. Examples of a Read command can be found in "SCSI Block Commands-3 (SBC-3)", (Project T10/1799-D), Revision 6, 24 Jul. 2006, propagated by the T10 Technical Committee of the InterNational Committee on Information Technology Standards (INCITS), which is hereby incorporated by reference.

Methods and systems for sending data over a network to a drive can include sending multiple Write commands to a specified drive from a known location in a network utilizing a device which may be an infusion device. The infusion device may be connected to the network at the known location and may send a Write command to the specified drive. In response to receiving the Write command or processing the Write command (for example, by writing data contained in the Write command to media), the specified drive may return an indication such as a command complete message to the infusion device, in response to which the infusion device sends another Write command. The above process may be repeated multiple times such that data is infused into the network at a known location and sent to the specified drive at a data transfer rate supported by the network portion downstream of the known location of the infusion device and upstream of the library drive.

Methods and systems for sending data over a network from a drive can include sending multiple Read commands to a specified drive from a known location in a network utilizing a device which may be an infusion device. The infusion device may be connected to the network at the known location and may send a Read command to the specified drive. In response to receiving the Read command and processing the Read command (for example, by reading data from media), the specified drive may return read data to the infusion device, in response to which the infusion device sends another Read command. The above process may be repeated multiple times such that data is infused into the network and sent to a known location from the specified drive at a data transfer rate supported by the network portion downstream of the known location of the infusion device and upstream of the library drive.

Figure 2:
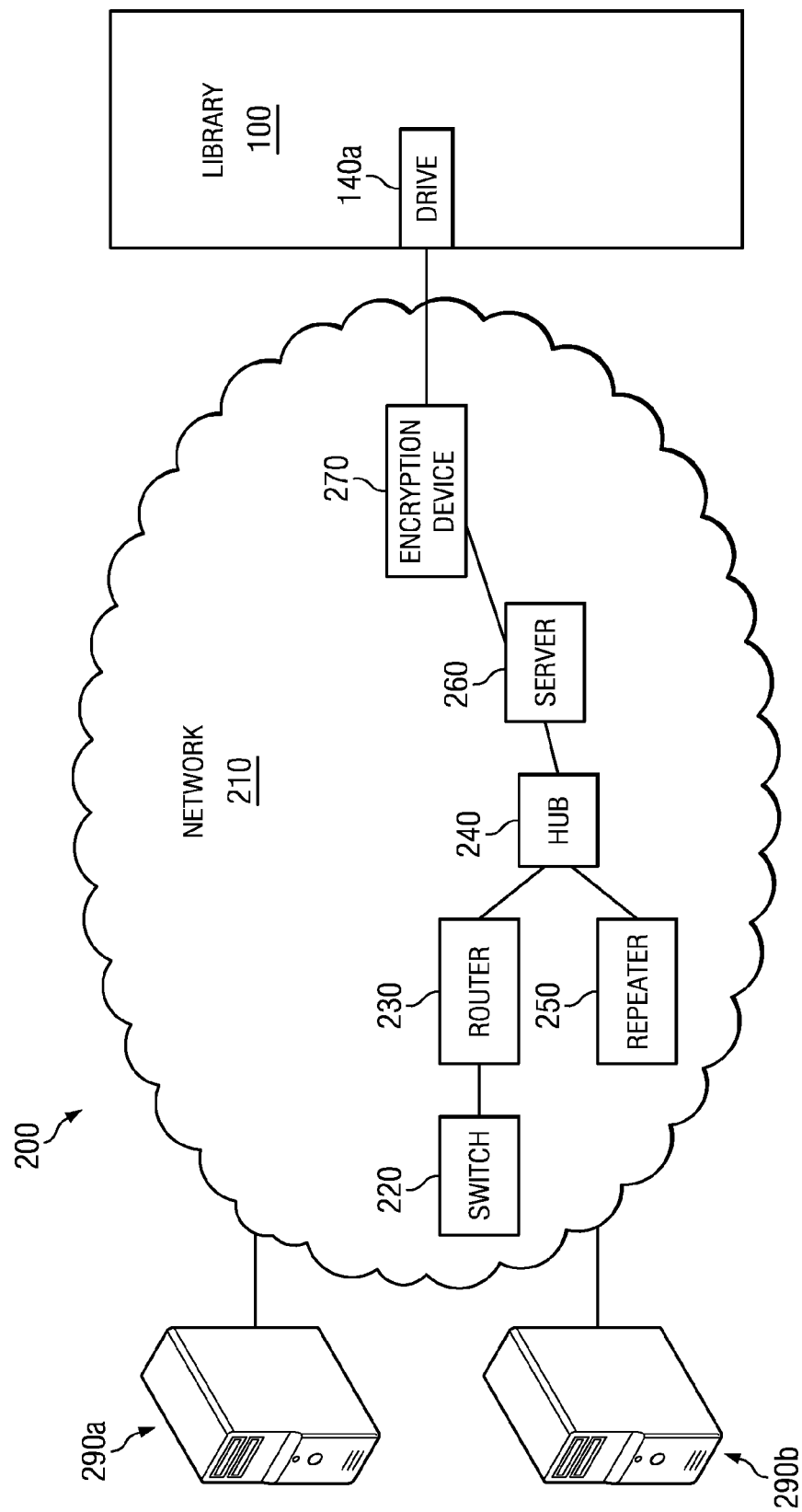
FIG. 2 is a diagrammatic representation of one embodiment of a network.

FIG. 2 is a diagrammatic representation of one embodiment of a system 200. In system 200, hosts 290a and 290b, which may be personal computers, and library 100 are coupled to network 210 such that hosts 290a and 290b may send data over network 210 to a drive at library 100, namely drive 140a. In FIG. 2, network 210 may be a fibre channel network, IP network or any other network or combination of networks. Network 210 can comprise network devices such as switch 220, router 230, hub 240, repeater 250, server 260, encryption device 270 or other network devices. Data sent from hosts 290a and 290b over network 210 to be stored at library 100 may traverse a path which includes any number of network devices, including switch 220, router 230, hub 240, repeater 250, server 260 or encryption device 270, alone or in combination. One or more network devices comprising network 210, including network devices 220-270, may slow the transfer of data from hosts 290a or 290b to library 100, thus reducing the data transfer rate to drives in library 100, potentially starving the drives of data, causing drives to receive data at or below a streaming rate. Network devices may slow the transfer of data to library 100 because they are not properly configured, because they are not working properly, because they are poorly-performing devices or any one of a number of other reasons.

Figure 3:
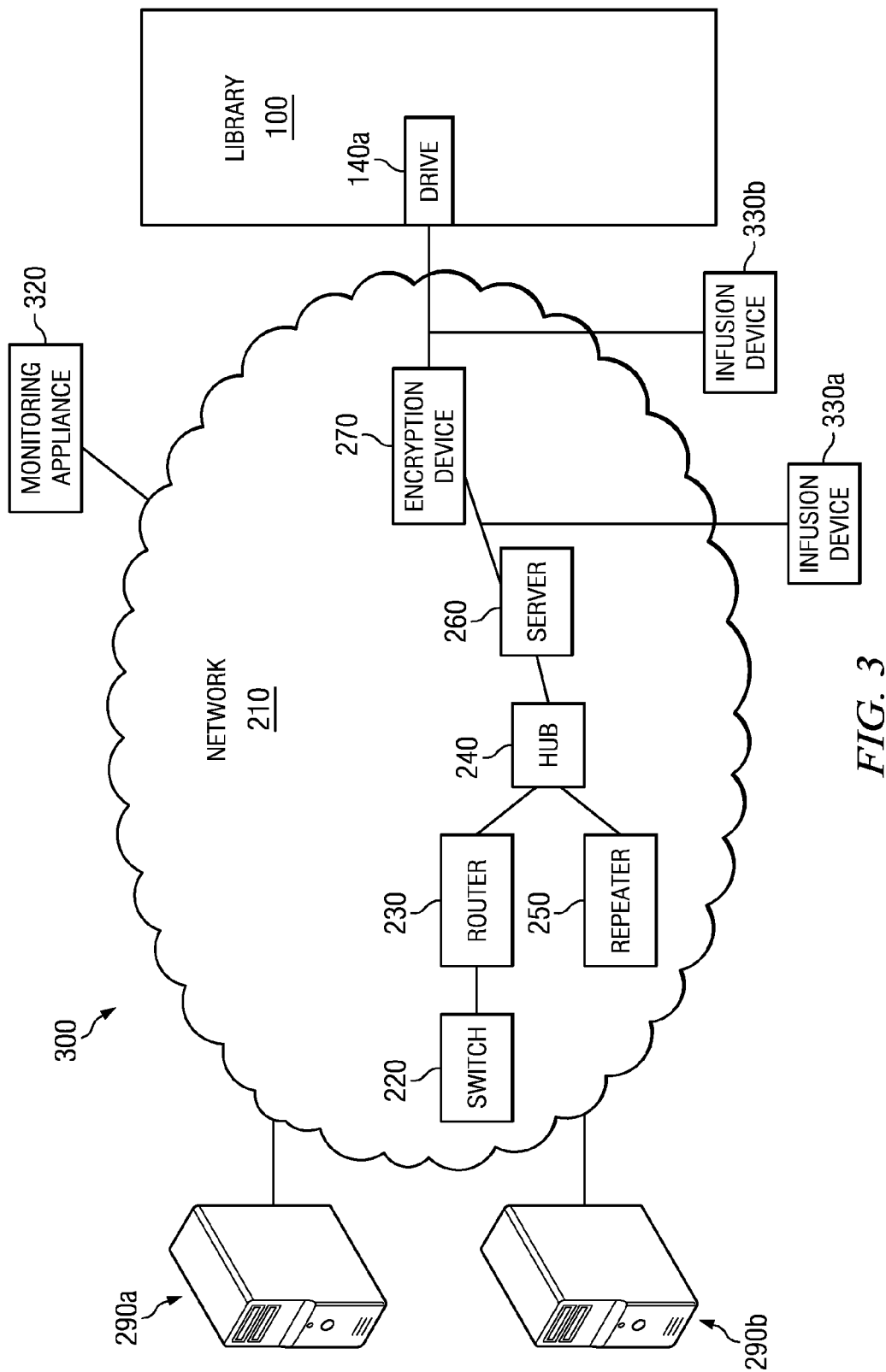
FIG. 3 is a diagrammatic representation of one embodiment of a network.

FIG. 3 is an embodiment of a system operable to artificially infuse data into a network such that the network can be diagnosed and problem network devices or other issues identified. System 300 of FIG. 3 comprises infusion devices 330 and monitoring appliance 320, all of which are coupled to network 210. Monitoring appliance 320 is coupled to network 210 such that monitoring appliance 320 can send commands to and receive data from the devices comprising library 100 (for example, drive 140a) over network 210. In response to the commands, monitoring appliance 320 can receive information that allows monitoring appliance 320 to determine the data transfer rate of data received at (or sent from) library 100. By infusing data with infusion device(s) 330 at known locations and known data transfer rates, and evaluating the data received from library 100, the location and magnitude of bottlenecks and other inefficiencies can be determined.

As an initial example, inefficiencies caused by encryption device 270 can be identified. In network 210, encryption device 270 encrypts data sent over network 210 to drive 140a of library 100. Encryption device 270 receives data destined for drive 140a and encrypts the data before transmitting the encrypted data to drive 140a. Drive 140a receives the encrypted data and writes the encrypted data to magnetic tape. If drive 140a receives the encrypted data at or below its streaming rate, the magnetic tape may have to be slowed or reversed while writing in order to write data with the necessary density.

To determine the performance of encryption device 270, infusion devices 330 may be coupled to network 210. Infusion device 330a is coupled to network 210 upstream of encryption device 270 such that infusion device 330a is operable to infuse known data, such as, for example, data with a known compressibility, known data sequences or with other known parameters, into network 210 such that the infused data traverses a network path including encryption device 270 before the infused data reaches drive 140a. During processing of the infused data (which may, in one embodiment, comprise writing the data to tape) at drive 140a, monitoring appliance 320 can query the amount of data received at drive 140a over time by sending LS commands over network 210 to drive 140a, in response to which drive 140a returns the amount of data received, the amount of data written, the speed at which data was written or other data. Based on the returned amount of data received, the monitoring appliance can determine the data transfer rate at the drive and thus the data transfer rate (i.e. throughput) through encryption device 270.

Infusion device 330b is coupled to network 210 downstream of encryption device 270 such that infusion device 330b is operable to infuse known data (for example, data with a known compressibility, known data sequences or with other known parameters) into network 210 such that the infused data traverses a network path which does not include encryption device 270. During processing of the infused data (which may, in one embodiment, comprise writing the data to tape) at drive 140a, monitoring appliance 320 can query the amount of data received at drive 140a over time by sending LS commands over network 210 to drive 140a, in response to which drive 140a returns the amount of data received, the amount of data written, the speed at which data was written or other data. Based on the returned amount of data received, the monitoring appliance can determine the data transfer rate at the drive and thus the data transfer rate (i.e. throughput) through network 210 downstream of encryption device 270.

In one embodiment, to determine the data transfer rate of infused data, multiple LS commands may be sent to a drive at a predetermined frequency while the drive is writing the artificially infused data to tape. The data returned may include the amount of data transferred to the drive over the network in the interim between the last LS command, thus the data transfer rate at the drive can be calculated by dividing the amount of data (which may be in MB) received by the drive over the network between LS commands by the duration between the LS commands (which may be in seconds).

The differential between the data transfer rates of data infused by infusion device 330a and data infused by infusion device 330b (i.e. the difference in throughput) can be used to diagnose whether encryption device 270 acts as a bottleneck or otherwise hinders the transmission of data to drive 140a over network 210. For example, if encryption device 270 encrypts data at below a certain rate and is consequently not able to transfer data at an adequate data transfer rate to drive 140a, drive 140a may be starved of data. Thus, to detect such an issue or problem or similar issues or problems, data may be infused upstream of encryption device 270 by infusion device 330a, if the data transfer rate of the data infused by infusion device 330a is lower than the data transfer rate of the data infused by infusion device 330b, than encryption device 270 may be acting as a bottleneck and reducing throughput through the network.

In another example, infusion devices 330a and 330b may send Read commands to drive 140a over network 210. Monitoring appliance 320 can use LS commands to determine the data transfer rates of data sent from drive 140a to infusion devices 330a and 330b: if the data transfer rate is higher at infusion device 330b than 330a, encryption device 270 may be acting as a bottleneck and reducing throughput through the network.

In one embodiment, monitoring appliance 320 can communicate with infusion devices 330 over network 210 to turn on or off data infusion from infusion device 330a or infusion device 330b into network 210. Monitoring appliance 320 may also select the data to be infused into network 210, for example, non-compressible data or compressible date having a known compression ratio. It may also be possible to activate infusion devices 330 utilizing a host which sends commands to infusion devices 330 over network 210. Monitoring appliance 320 may be notified over network 210 that an infusion device 330 has been activated and is infusing data into network 210. Monitoring appliance 320 may synchronize with an infusion device 330 through communications with the infusion device 330 over network 210. In another embodiment, infusion device(s) 330 may be manually activated. In another embodiment, an infusion device may have multiple connections and each of the multiple connections may be coupled to different known locations in the network. Thus, the infusion device may be able to infuse data at multiple points in the network. For example, the infusion device may have one connection upstream of encryption device 270 and another connection downstream of encryption device 270. In a still further embodiment, monitoring appliance may include an infusion device or an infusion device module which may be connected to one or more known location in a network, allowing the monitoring appliance to diagnose the network.

While in FIG. 3, a single pair of infusion devices are shown, multiple infusion devices may be utilized in a network to diagnose different devices or sections of a network. For example, in FIG. 3, an additional infusion device may be located upstream of hub 240 and infusion device 330a. If data from the additional infusion device is received at a drive at a lower data transfer rate than data infused by infusion device 330a, this implies that the network portion downstream of the additional infusion device but upstream of infusion device 330a is limiting throughput, acting as a bottleneck and consequently reducing the data transfer rate. Thus, multiple infusion devices may be used in conjunction to diagnose a network for problem devices. Multiple network devices in a network may reduce throughput, the use of multiple infusion devices or moving an infusion device to multiple locations in a network may allow the degree to which individual network devices reduce throughput to be determined. Depending on the data transfer rates of data received from particular infusion devices and the locations of the infusion devices, the source of network bottlenecks can be inferred.

Infusion devices may be operable to infuse different sets of known data with different properties. For example, such sets of known data may include data sets of different compression ratios. In one embodiment, a monitoring appliance can send one or more commands to an infusion device to select a particular set of data to infuse into a network. Sets of data sent from an infusion device may contain data allowing the data to be correlated with the infusion device that infused the data. Furthermore, infusion devices may be portable devices which may be removed and coupled to different locations in a network to diagnose different devices or network sections.

Figure 4:
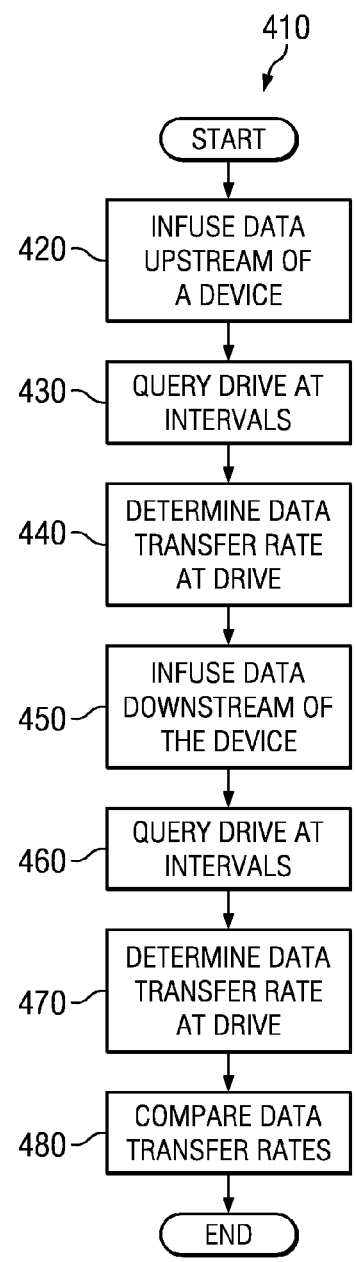
FIG. 4 is a flowchart illustrating a method for collecting and compiling network device data.

FIG. 4 is a flow chart illustrating a method 410 for identifying network bottlenecks or other network or network device issues. According to one embodiment, one or more steps of method 410 can be implemented as a set of computer executable instructions stored on computer readable media at, for example, monitoring appliance 320 and infusion device 330 of FIG. 3. The set of computer executable instructions can, when executed, be utilized to identify network bottlenecks. At step 420, known data destined for a known drive is infused upstream of a known device or network section. For example, 2:1 compressible data may be infused into a network upstream of an encryption device. At step 430, the drive receiving the data infused at step 420 may be queried at known intervals to determine the amount of data transferred to a drive between intervals. At step 440, the data transfer rate of the known data at the drive is determined. For example, LS commands may be sent to the drive every 30 seconds and the amount of data received at the drive in a 30 second interval divided by 30 seconds to determine the data transfer rate to the drive.

At step 450, known data destined for a known drive is infused downstream of a known device or network section. For example, 2:1 compressible data may be infused into a network downstream of an encryption device. At step 460, the drive receiving the data infused at step 450 may be queried at known intervals to determine the amount of data transferred to a drive between intervals. At step 470, the data transfer rate of the known data at the drive is determined. For example, LS commands may be sent to the drive every 30 seconds and the amount of data received at the drive in a 30 second interval divided by 30 seconds to determine the data transfer rate to the drive.

At step 480, the data transfer rate of data infused upstream of the known device or network section (determined at step 440) is compared to the data transfer rate of data infused downstream of the known device or network section (determined at step 470). If the data transfer rates are the same (or within some acceptable difference), then the device or network section is functioning correctly or not overly decreasing throughput. If, however, the data transfer rate of data infused upstream of the device or network section is lower than the data transfer rate of data infused downstream of the device or network section, the device or network section is reducing throughput and acting as a bottleneck to the transfer of data. Thus, problem devices may be identified and the degree to which problem devices reduce throughput can be determined. Method 410 or one or more steps of method 410 may be repeated to diagnose multiple devices or sections comprising a network to identify throughput losses and device performance issues throughout the network.

While method 410 of FIG. 4 regards sending data to a drive, in other embodiments, data can be sent from a drive and received at known locations in a network. The data transfer rates of data received upstream and downstream of network devices or network portions can be compared to identify problem devices or problem network portions and the corresponding reduction in throughput.

In one embodiment, a monitoring appliance can compile data returned in response to LS or Inquiry commands in defined structures (which may be, in one embodiment, XML structures or other structures). A structure may contain data associated with a library component returned in response to one or more commands (which may be, in one embodiment, LS or Inquiry commands). For example, a XML structure can include the amount of data received by (or sent from) a drive at a point in time from a LS command and the unique serial number of the drive determined from an Inquiry command issued to the drive. Such structures may be contained in a repository and compared such that data transfer rates can be determined for a drive. For example, a structure associated with a point in time may be compared with a structure associated with a subsequent point in time. The difference between the amount of data received by (or sent from) a drive can be determined through a comparison of the two structures and based on the difference in time between the two structures, an approximate data transfer rate for a point in time can be determined.

FIG. 5 is an XML representation of an example of data returned in response to a LS command. The data may include the amount of data received by a drive at a point in time. For example, MB read 510 is the amount of data received by a drive at a point in time. Data returned in response to LS commands sent at different times may include the amounts of data received by a drive at different times. The difference in the amounts of data received by a drive at two points in time may be divided by the duration between the two points in time to determine the data transfer rate at the drive at an approximate point in time.

Based on the determined data transfer rate at the drive, it can be ascertained whether the drive is being starved of data and whether and to what extent shoe-shining is occurring. Furthermore, because the data transfer rate is monitored over continuous intervals of time, data transfer rates over time can be stored (for example, in a repository), giving a user (virtual or otherwise) a relatively accurate data transfer rate history over time. For example, when the data transfer rate is determined over periodic 30 second intervals, the data transfer rate at the drive is up-to-date on at least a 30 second interval. Thus, the current data transfer rate may be presented to a user or a data transfer rate history may be presented to a user utilizing a user interface. In one embodiment, a graph of the data transfer rate over time may be presented to a user utilizing a user interface.

Figure 6:
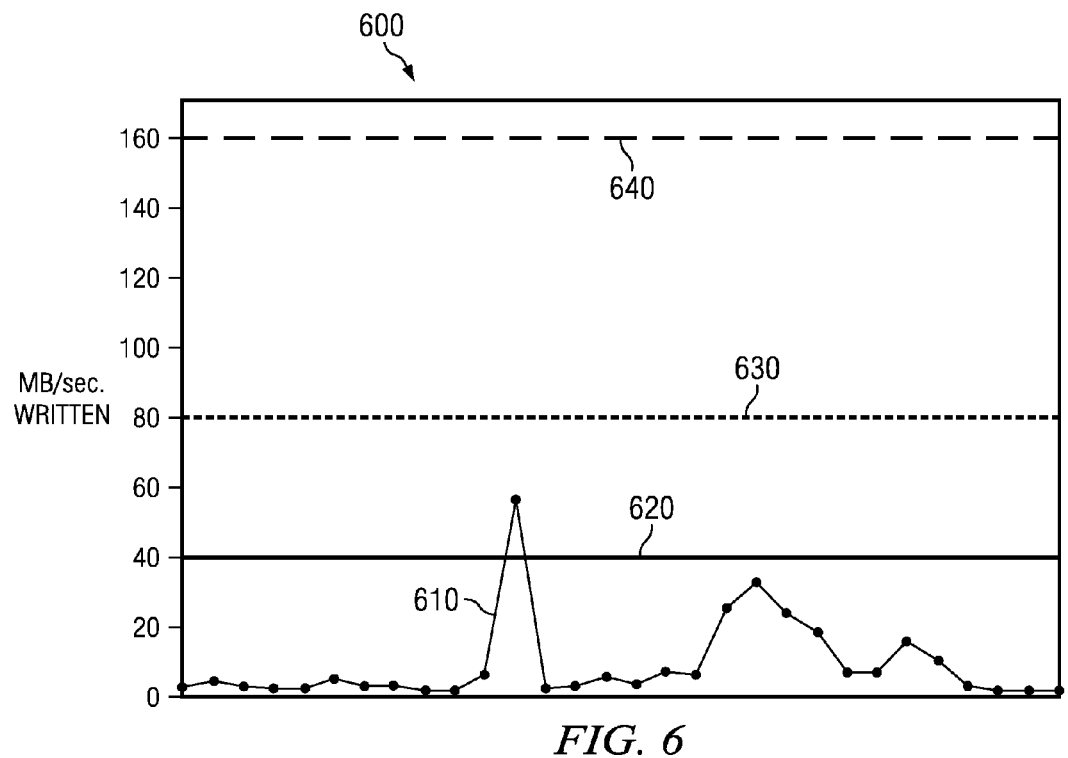
FIG. 6 is one example of a graphical user interface.

FIG. 6 is one example of a graphical user interface displaying a graphical representation 600 of the data transfer rate at a drive over time. Data transfer rate 610 is the data transfer rate of data received by a drive. Graphical representation 600 includes streaming rate indicator threshold line 620, which indicates the streaming level of the drive. Graphical representation 600 also includes ideal data transfer rate indicator line 630, which indicates the ideal data transfer rate for the drive and maximum data transfer rate indicator line 640, which indicates the maximum data transfer rate for the drive. Data transfer rate 610 can be compared with lines 620, 630 and 640 by a user viewing graphical representation 600. In one embodiment, data transfer rate 610 may graph the data transfer rate of data infused into a network by an infusion device at a known location.

Figure 7:
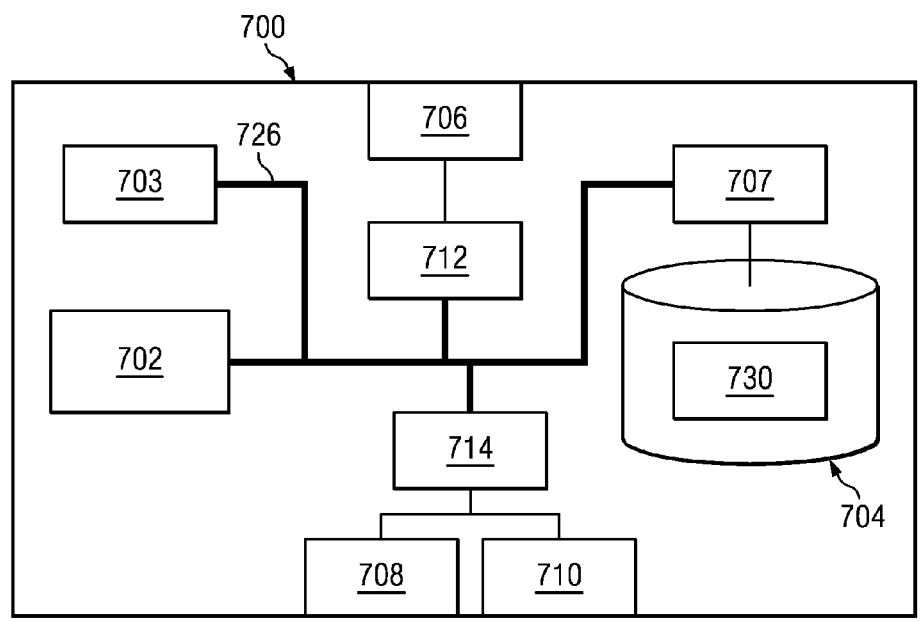
FIG. 7 is a diagrammatic representation of one embodiment of a controller which can be used in a monitoring appliance.

FIG. 7 is a diagrammatic representation of a monitoring appliance controller 700 ("controller 700"). Controller 700 can include a processor 702, such as an Intel Pentium 4 based processor (Intel and Pentium are trademarks of Intel Corporation of Santa Clara, Calif.), a primary memory 703 (which may be, for example, RAM, ROM, Flash Memory, EEPROM or other computer readable medium known in the art) and a secondary memory 704 (which may be, for example, a hard drive, disk drive, optical drive or other computer readable medium known in the art). A memory controller 707 can control access to secondary memory 704. Controller 700 can comprise a communications interface 706 (which may be, for example, fibre channel interface, Ethernet port or other communications interface known in the art) to connect controller 700 to a network (for example, network 110 of FIG. 2). An I/O controller 712 can control interactions with the network. Similarly, an I/O controller 714 can control interactions over I/O interfaces 708 and 710. Controller 700 can include a variety of input devices. Various components of controller 700 can be connected by a bus 726.

Secondary memory 704 can store a variety of computer instructions that include, for example, an operating system such as a Windows or Linux operating system (Windows is a trademark of Redmond, Wash. based Microsoft Corporation) and applications that run on the operating system, along with a variety of data. More particularly, secondary memory 704 can store a software program 730 that interfaces with devices (which may be, for example, drives or infusion devices) over a network and determines the data transfer rate at one or more drives. During execution by processor 702, portions of program 730 can be stored in secondary memory 704 and/or primary memory 703.

While systems and methods have been described with reference to particular embodiments, it should be understood that the embodiments are illustrative and that the scope of the invention is not limited to these embodiments. For example, while systems and methods disclosed above are described with regard to a physical library, further embodiments of systems and methods described above may be used in the context of virtual tape libraries, optical jukeboxes, archive systems such as MAID systems or other archive systems and other mass storage systems using a variety of storage media. Many variations, modifications, additions and improvements to the embodiments described above are possible. It is contemplated that these variations, modifications, additions and improvements fall within the scope of the invention as detailed in the following claims.

What is claimed is:

1. A system for network diagnosis, comprising:
   a media library coupled to a network, the media library comprising a drive, a library controller and a plurality of media;
   an infusion node coupled to the network, wherein there is a portion of the network between the infusion node and the drive, the infusion node configured to infuse control data into the network at an infused data transfer rate, wherein infusing control data into the network comprises sending commands to the drive to write corresponding data to the drive; and
   a monitoring appliance coupled to the network and configured to:
      when the control data is being transferred at the drive, send a first command to the drive over the network and send a second command to the drive over the network to collect data generated by the drive;
      receive a first response from the drive specifying a first amount of data and a second response from the drive specifying a second amount of data; and
      determine a measure of network performance for the portion of the network between the infusion node and the drive based on the first response and the second response.

2. The system of claim 1, wherein the measure of network performance comprises an actual data transfer rate at the drive.

3. The system of claim 2, wherein the monitoring appliance is further configured to compare the actual data transfer rate to a desired data transfer rate.

4. The system of claim 2, wherein the actual data transfer rate is a data transfer rate at which the drive received the control data.

5. The system of claim 2, wherein the actual data transfer rate is a data transfer rate at which the drive wrote the control data.

6. The system of claim 1, wherein infusing control data into the network comprises sending SCSI WRITE commands to the drive and the first command and second command are SCSI commands.

7. The system of claim 1, wherein the monitoring appliance is further configured to send a command to the infusion node to initiate infusing the control data.

8. A method for network diagnosis, comprising:
   at an infusion node coupled to a network, wherein there is a portion of the network between the infusion node and a drive of a media library coupled to the network, infusing control data into the network at an infused data transfer rate, wherein infusing control data into the network comprises sending commands to the drive to write corresponding data to the drive; and
   at a monitoring appliance coupled to the network:
   periodically sending commands to the drive over the network while the control data is being transferred at the drive to collect data generated by the drive;
   receiving responses to the commands from the drive, the responses specifying amounts of data; and
   determining a measure of network performance for the portion of the network between the infusion node and drive based on the responses from the drive.

9. The method of claim 8, wherein the measure of network performance comprises an actual data transfer rate at the drive.

10. The method of claim 9, further comprising comparing the actual data transfer rate to a desired data transfer rate.

11. The method of claim 9, wherein the actual data transfer rate comprises a data transfer rate at which the drive received the control data.

12. The method of claim 9, wherein the actual data transfer rate comprises a data transfer rate at which the drive wrote the control data.

13. The method of claim 8, wherein infusing control data into the network comprises sending SCSI READ commands to the drive and periodically sending commands to the drive comprises sending SCSI commands to the drive.

\* \* \* \* \*